United States Patent
Horng et al.

(10) Patent No.: US 10,476,325 B2
(45) Date of Patent: Nov. 12, 2019

(54) INNER-ROTOR MOTOR AND ROTOR THEREOF

(71) Applicant: Sunonwealth Electric Machine Industry Co., Ltd., Kaohsiung (TW)

(72) Inventors: Alex Horng, Kaohsiung (TW); Chi-Min Wang, Kaohsiung (TW); Ku-Ling Liu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 82 days.

(21) Appl. No.: 15/273,759

(22) Filed: Sep. 23, 2016

(65) Prior Publication Data

US 2017/0110918 A1 Apr. 20, 2017

(30) Foreign Application Priority Data

Oct. 16, 2015 (TW) .............................. 104134060 A

(51) Int. Cl.
*H02K 1/27* (2006.01)
*H02K 7/00* (2006.01)

(52) U.S. Cl.
CPC ........... *H02K 1/2706* (2013.01); *H02K 7/003* (2013.01)

(58) Field of Classification Search
CPC .............................. H02K 1/2706; H02K 7/003
See application file for complete search history.

(56) References Cited

U.S. PATENT DOCUMENTS

| | | | | |
|---|---|---|---|---|
| 4,543,506 A * | 9/1985 | Kawada | ............... | H02K 1/2773 310/156.22 |
| 5,786,650 A * | 7/1998 | Uchida | ................ | H02K 1/2773 310/156.55 |
| 6,703,741 B1 * | 3/2004 | Ifrim | .................... | H02K 1/2773 310/156.19 |
| 8,138,649 B2 * | 3/2012 | Bradfield | ............. | H02K 21/044 310/156.08 |
| 8,922,083 B2 * | 12/2014 | Asahi | ................... | H02K 1/2706 310/156.08 |
| 9,099,905 B2 * | 8/2015 | Manz | .................... | H02K 1/2773 |
| 9,281,723 B2 | 3/2016 | Watanabe et al. | | |
| 10,020,701 B2 * | 7/2018 | Kamiyoshihara | .... | H02K 1/2773 |
| 2011/0254399 A1 * | 10/2011 | Blanc | ................... | H02K 1/2773 310/156.22 |

(Continued)

FOREIGN PATENT DOCUMENTS

CN 202759303 U 2/2013

*Primary Examiner* — Robert W Horn
(74) *Attorney, Agent, or Firm* — Alan D. Kamrath; Kamrath IP Lawfirm, P.A.

(57) ABSTRACT

An inner-rotor motor and a rotor of the inner-rotor motor reduce noise or vibration generated during the rotation of the motor. The rotor includes a shaft, an iron core, a plurality of permanent magnets and a limiting member. The iron core includes a magnetic yoke portion coupled with an outer periphery of the shaft, as well as a plurality of magnetic pole portions circumferentially coupled with an outer periphery of the magnetic yoke portion. The iron core forms a plurality of receiving portions, and each receiving portion is formed between two adjacent magnetic pole portions. The permanent magnets are received in the receiving portions, respectively. The limiting member is arranged at one side of the iron core, and includes a covering face covering the permanent magnets in the axle direction of the shaft.

20 Claims, 13 Drawing Sheets

(56) References Cited

U.S. PATENT DOCUMENTS

| | | | | |
|---|---|---|---|---|
| 2013/0057103 A1* | 3/2013 | Han | ............... | H02K 1/2773 |
| | | | | 310/156.12 |
| 2013/0187486 A1* | 7/2013 | Lee | ............... | H02K 5/02 |
| | | | | 310/43 |
| 2013/0187506 A1* | 7/2013 | Lee | ............... | H02K 1/278 |
| | | | | 310/156.12 |
| 2014/0103768 A1* | 4/2014 | Brahmavar | ............... | H02K 21/16 |
| | | | | 310/156.08 |
| 2014/0354103 A1* | 12/2014 | Kang | ............... | H02K 1/2773 |
| | | | | 310/156.38 |
| 2016/0359384 A1* | 12/2016 | Okamoto | ............... | H02K 1/276 |
| 2017/0110918 A1* | 4/2017 | Horng | ............... | H02K 1/2706 |
| 2018/0069443 A1* | 3/2018 | Han | ............... | H02K 1/27 |

\* cited by examiner

INNER-ROTOR MOTOR AND ROTOR THEREOF

CROSS REFERENCE TO RELATED APPLICATIONS

The application claims the benefit of Taiwan application serial No. 104134060, filed on Oct. 16, 2015, and the subject matter of which is incorporated herein by reference.

BACKGROUND OF THE INVENTION

1. Field of the Invention

The present invention generally relates to an inner-rotor motor and a rotor of the inner-rotor motor and, more particularly, to a rotor having an iron core and an inner-rotor motor using the rotor.

2. Description of the Related Art

FIG. 1 shows a rotor 9 of a conventional inner-rotor motor. The rotor 9 includes a shaft 91, an iron core 92 and a plurality of permanent magnets 93. The iron core 92 includes a tubular connection portion 921 fitted around the shaft 91. The tubular connection portion 921 is connected to a plurality of magnetic pole portions 922. The quantities of the plurality of magnetic pole portions 922 and the plurality of permanent magnets 93 correspond to the quantity of the magnetic poles of the rotor 9. The iron core 92 includes a plurality of magnet-receiving gaps 923 extending through the iron core 92 in an extending direction of the shaft 91. Each of the plurality of magnet-receiving gaps 923 is located radially outward of the tubular connection portion 921 between two adjacent magnetic pole portions 922. In this arrangement, the plurality of permanent magnets 93 can be respectively received in the plurality of magnet-receiving gaps 923. One embodiment of such a rotor 9 can be seen in China Patent No. CN202759303.

In this arrangement, when one permanent magnet 93 is received in a magnet-receiving gap 923 between two adjacent magnetic pole portions 922, each side of the surface of the permanent magnet 93 in a circumferential direction of the rotor 9 can be securely coupled with the lateral surface of a respective magnetic pole portion 922. However, there exists a gap 94 between the tubular connection portion 921 and the permanent magnet 93, leading to an insufficient bonding effect between the iron core 92 and the permanent magnet 93. As a result, during the rotation of the rotor 9, the permanent magnet 93 may displace in the magnet-receiving gap 923 or may even disengage from the magnet-receiving gap 923. Thus, the rotor 9 is unbalanced during the rotation thereof, leading to the generation of noise or vibration.

To solve the problem, the gap 94 may be filled with an adhesive to reinforce the bonding effect between the permanent magnet 93 and the iron core 92. However, the use of the adhesive will increase the complexity of the production procedure. Moreover, the permanent magnet 93 needs to bear a radially outward inertia force during the rotation of the rotor 9, leading to the deterioration or disengagement of the adhesive after a long term of use. Disadvantageously, the service life of the rotor 9 is shortened.

In light of this, it is necessary to provide a novel inner-rotor motor and a rotor of the inner-rotor motor. As such, the problems in regard to noise, vibration, complex production procedure or short service life can be solved.

SUMMARY OF THE INVENTION

It is therefore the objective of this invention to provide an inner-rotor motor and a rotor of the inner-rotor motor, in which a limiting member is provided to cover and fix a plurality of permanent magnets of the rotor in the receiving portions of the iron core. As such, the bonding effect between the plurality of permanent magnets and the iron core can be reinforced.

In an embodiment of the invention, a rotor of an inner-rotor motor includes a shaft, an iron core, a plurality of permanent magnets and a limiting member. The iron core includes a magnetic yoke portion coupled with an outer periphery of the shaft, as well as a plurality of magnetic pole portions circumferentially coupled with an outer periphery of the magnetic yoke portion. The iron core forms a plurality of receiving portions, and each of the plurality of receiving portions is formed between adjacent two of the plurality of magnetic pole portions. The plurality of permanent magnets is received in the plurality of receiving portions, respectively. The limiting member is arranged at one side of the iron core in an axle direction of the shaft, and includes a covering face covering the plurality of permanent magnets in the axle direction of the shaft.

In a form shown, each of the plurality of permanent magnets includes a first face facing the magnetic yoke portion, as well as a second face facing away from the magnetic yoke portion. The first face is spaced from a center of the shaft at a first radius. The first radius is a distance between the first face and the center of the shaft in a radial direction perpendicular to the shaft. The covering face has a second radius. The second radius is a maximum distance between an edge of the covering face and the center of the shaft in the radial direction perpendicular to the shaft. The second radius is larger than the first radius.

In the form shown, the second face is spaced from the center of the shaft at a third radius. The third radius is a distance between the second face and the center of the shaft in the radial direction perpendicular to the shaft. The third radius is larger than the first radius, and the second radius is equal to or larger than the third radius.

In the form shown, another limiting member is arranged at another side of the iron core in the axle direction of the shaft.

In the form shown, the limiting member is made of magnetically nonconductive material.

In the form shown, the limiting member includes a shaft-coupling portion at a center of the limiting member. The shaft-coupling portion forms a shaft hole, and the shaft extends through and couples with the shaft-coupling portion in a press fit manner.

In the form shown, the plurality of receiving portions extends through the iron core from one end face to another end face in the axle direction of the shaft.

In the form shown, the plurality of permanent magnets has a same quantity as the plurality of magnetic pole portions, and the plurality of receiving portions also has a same quantity as the plurality of magnetic pole portions.

In the form shown, the covering face abuts against the plurality of permanent magnets.

In the form shown, the covering face is formed on one face of the limiting member facing the iron core in the axle direction of the shaft.

In the form shown, each of the plurality of magnetic pole portions includes two protrusions which are located radially outwards of the shaft and extend in circumferentially opposite directions. Each of the plurality of permanent magnets includes a first face facing the magnetic yoke portion, as well as a second face facing away from the magnetic yoke portion. The second face abuts against the protrusions of adjacent two of the plurality of magnetic pole portions.

In the form shown, the limiting member includes a plurality of engaging portions. Each of the plurality of engaging portions extends towards a respective one of the plurality of receiving portions and abuts against the first face of a respective one of the plurality of permanent magnets.

In the form shown, the limiting member includes a shaft-coupling portion at a center of the limiting member. The shaft-coupling portion forms a shaft hole, the shaft extends through the shaft hole, and the plurality of engaging portions is circumferentially arranged around the shaft-coupling portion.

In the form shown, the plurality of engaging portions is formed on the covering face by a punching process.

In the form shown, each of the plurality of permanent magnets includes a first face facing the magnetic yoke portion, as well as a second face facing away from the magnetic yoke portion. The first face abuts against the outer periphery of the magnetic yoke portion.

In the form shown, the limiting member includes a plurality of engaging portions. Each of the plurality of engaging portions extends towards a respective one of the plurality of receiving portions and abuts against the second face of a respective one of the plurality of permanent magnets.

In the form shown, the plurality of engaging portions is arranged at an edge of the covering face.

In the form shown, the plurality of engaging portions is bent towards the iron core at the edge of the covering face.

In the form shown, each of the plurality of engaging portions includes a projection abutting against the second face of the respective one of the plurality of permanent magnets.

In the form shown, each of the plurality of engaging portions includes an abutting portion distant to the covering face. The abutting portion extends towards and abuts against the second face of the respective one of the plurality of permanent magnets.

In another embodiment, an inner-rotor motor having the rotor as described above is disclosed. The inner-rotor motor includes a stator in an enclosed form having a compartment. The iron core and the plurality of permanent magnets are received in the compartment. The shaft is rotatably coupled with the stator.

The inner-rotor motor and the rotor of the motor are able to prevent the plurality of permanent magnets from disengaging from the receiving portions during the rotation of the rotor by covering the plurality of permanent magnets with one or more limiting members arranged at one or two sides of the iron core in the axle direction of the shaft. As such, the noise or vibration generated during the rotation of the inner-rotor motor can be reduced. Furthermore, in the structures of the inner-rotor motor and the rotor of the motor, the coupling effect between the plurality of permanent magnets and the iron core can be reinforced by simply coupling the one or more limiting members with the shaft without applying the adhesive between the plurality of permanent magnets and the magnetic yoke portion. Thus, the production procedure of the rotor of the inner-rotor motor is simplified. Besides, the bonding effect between the plurality of permanent magnets and the iron core does not degrade after a long term of use of the rotor, thus prolonging the service life of the rotor of the inner-rotor motor.

BRIEF DESCRIPTION OF THE DRAWINGS

The present invention will become more fully understood from the detailed description given hereinafter and the accompanying drawings which are given by way of illustration only, and thus are not limitative of the present invention, wherein.

Figure 1:
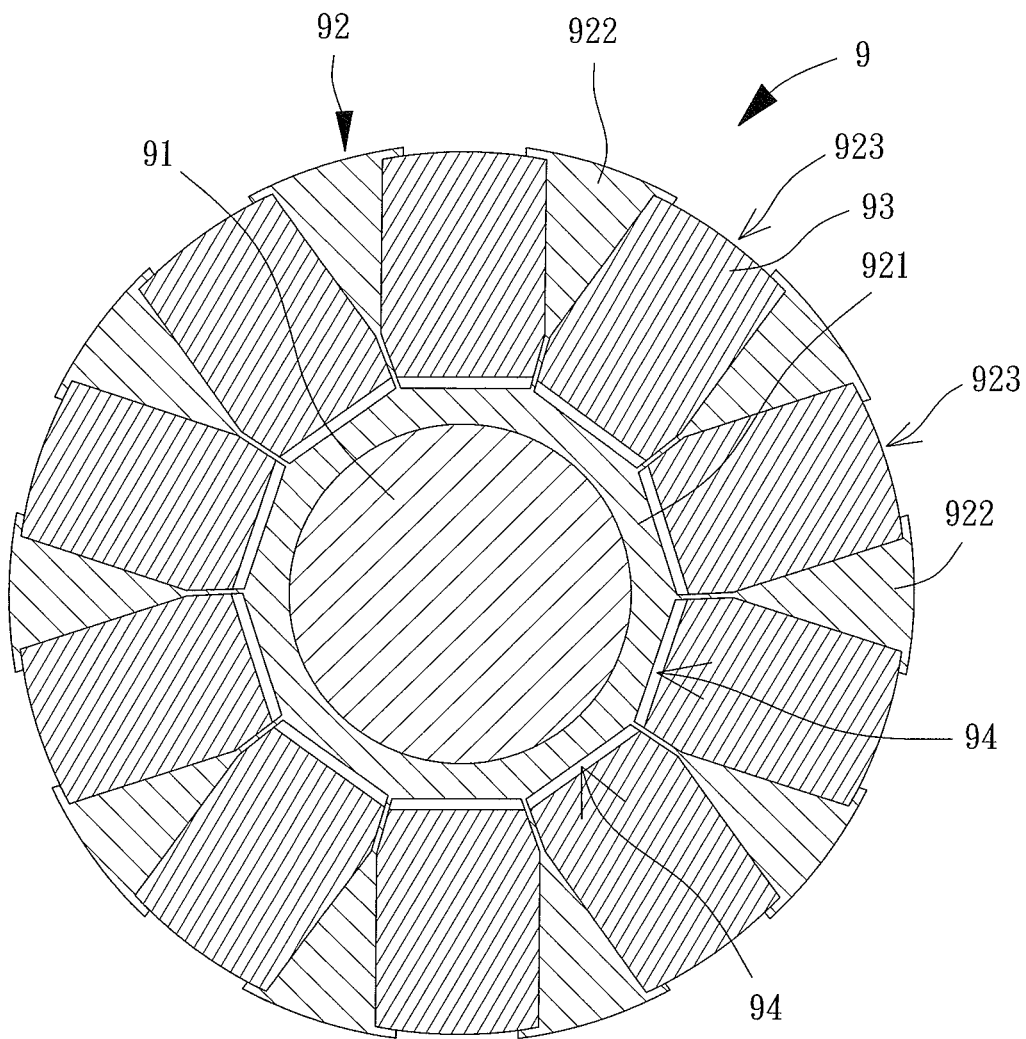
FIG. 1 is a top view of a rotor of a conventional inner-rotor motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
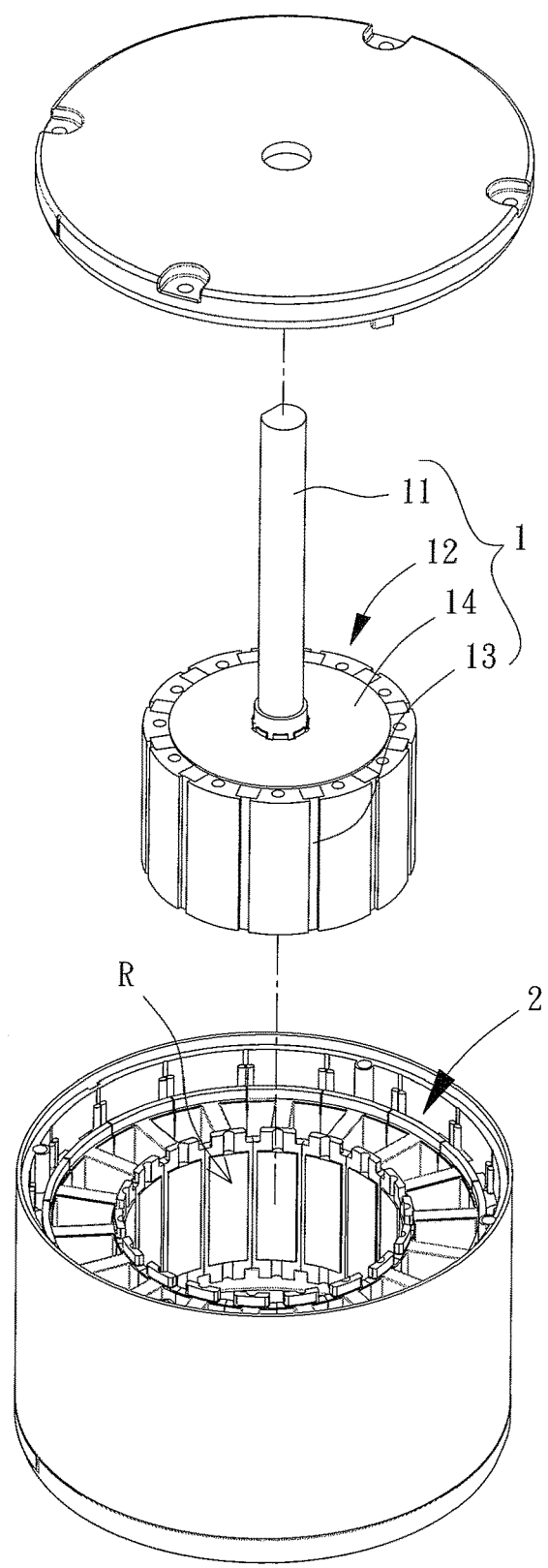
FIG. 2 is an exploded view of an inner-rotor motor according to a first embodiment of the invention.

FIG. 2 is an exploded view of an inner-rotor motor according to a first embodiment of the invention. The inner-rotor motor includes a rotor 1 and a stator 2. The rotor 1 is rotatably coupled with the stator 2.

Figure 3:
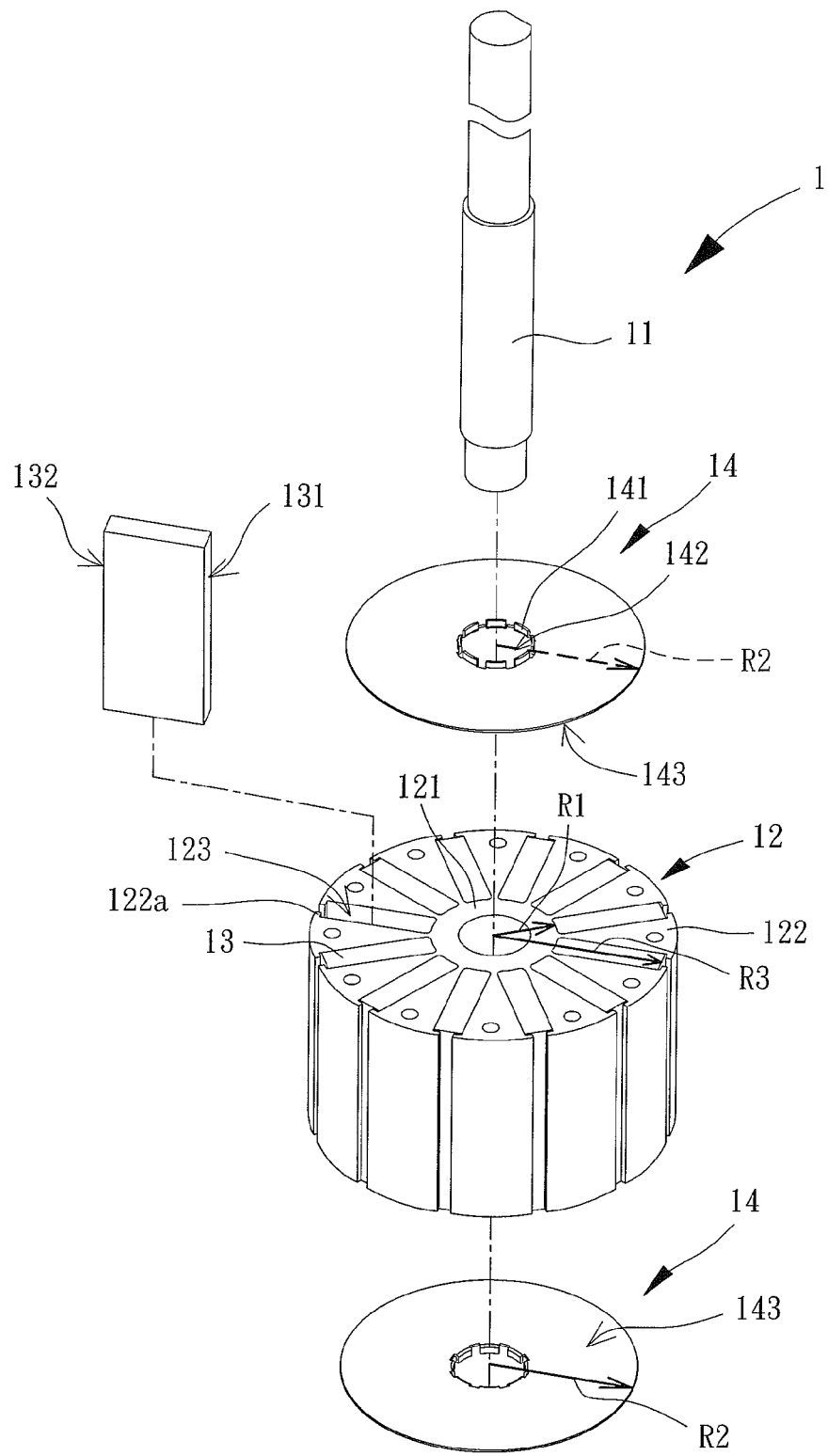
FIG. 3 is an exploded view of a rotor of the inner-rotor motor according to the first embodiment of the invention.

FIG. 3 is an exploded view of the rotor 1. The rotor 1 includes a shaft 11, an iron core 12, a plurality of permanent magnets 13 and at least one limiting member 14. The iron core 12 and the at least one limiting member 14 are coupled with the shaft 11. The plurality of permanent magnets 13 is mounted to the iron core 12. The stator 2 (shown in FIG. 2) is in an enclosed form having a compartment "R." The iron core 12 and the plurality of permanent magnets 13 are received in the compartment "R." The shaft 11 is rotatably coupled with the stator 2.

The iron core 12 is made of magnetically conductive material. For example, the iron core 12 may be in the form of a plurality of stacked silicon steel plates, or may be in the form of a monolithic piece made of magnetically conductive material. The iron core 12 includes a magnetic yoke portion 121 coupled with the outer periphery of the shaft 11, as well as a plurality of magnetic pole portions 122 circumferentially coupled with the outer periphery of the magnetic yoke portion 121. A receiving portion 123 is formed between two adjacent magnetic pole portions 122. The receiving portion 123 is located outwardly of the magnetic yoke portion 121 in a radial direction perpendicular to the shaft 11. The quantity of the receiving portions 123 may correspond to that of the plurality of magnetic pole portions 122. The receiving portion 123 may extend through the iron core 12 from one end face to another end face in an axle direction (i.e. the extending direction) of the shaft 11.

Each of the plurality of permanent magnets 13 is received in a respective receiving portion 123 of the iron core 12. Each receiving portion 123 may receive a permanent magnet 13. Thus, the quantity of the plurality of permanent magnets 13 may also correspond to that of the plurality of magnetic pole portions 122. The plurality of permanent magnets 13 is made of magnetically conductive material.

The at least one limiting member 14 can be made of magnetically nonconductive material (material rather than iron, cobalt and nickel). For example, the at least one limiting member 14 may be made of aluminium or copper. The at least one limiting member 14 is coupled with the shaft 11, and has a radial extent covering the plurality of permanent magnets 13 in the axle direction of the shaft 11. Each of the at least one limiting member 14 may be placed at one side of the iron core 12 in the axle direction of the shaft 11. For example, in the embodiment, since the receiving portion 123 may extend through the iron core 12 from one end face to another end face, the quantity of the at least one limiting member 14 may be two. The two limiting members 14 are respectively arranged at two sides of the iron core 12 in the axle direction of the shaft 11. Each of the limiting members 14 may be in the form of a disk or a plate with another shape. Each of the limiting members 14 may be coupled with the shaft 11. In this arrangement, the two limiting members 14 are able to cover the plurality of permanent magnets 13 in the axle direction of the shaft 11. However, if the receiving portion 123 is formed on only one end face of the iron core 12 (i.e. extending into the iron core 12 on only one end face of the iron core 12), there may be only one limiting member 14.

Specifically, each of the limiting members 14 includes a shaft-coupling portion 141 at the center thereof. The shaft-coupling portion 141 forms a shaft hole 142. The shaft 11 may extend through the shaft hole 142. The shaft-coupling portion 141 can be press fit around the shaft 11, so that the limiting member 14 can be fixed to the shaft 11 via the shaft-coupling portion 141 and the shaft hole 142. However, in another embodiment of the invention, the shaft-coupling portion 141 may be coupled with the shaft 11 by screwing or welding instead of press fitting. Each of the limiting members 14 preferably includes a covering face 143 in the form of a flat face. The covering face 143 is formed on one face of the limiting member facing the iron core 12 in the axle direction of the shaft 11. Thus, the limiting member 14 is able to cover the plurality of permanent magnets 13 via the covering face 143 in the axle direction of the shaft 11.

Figure 4:
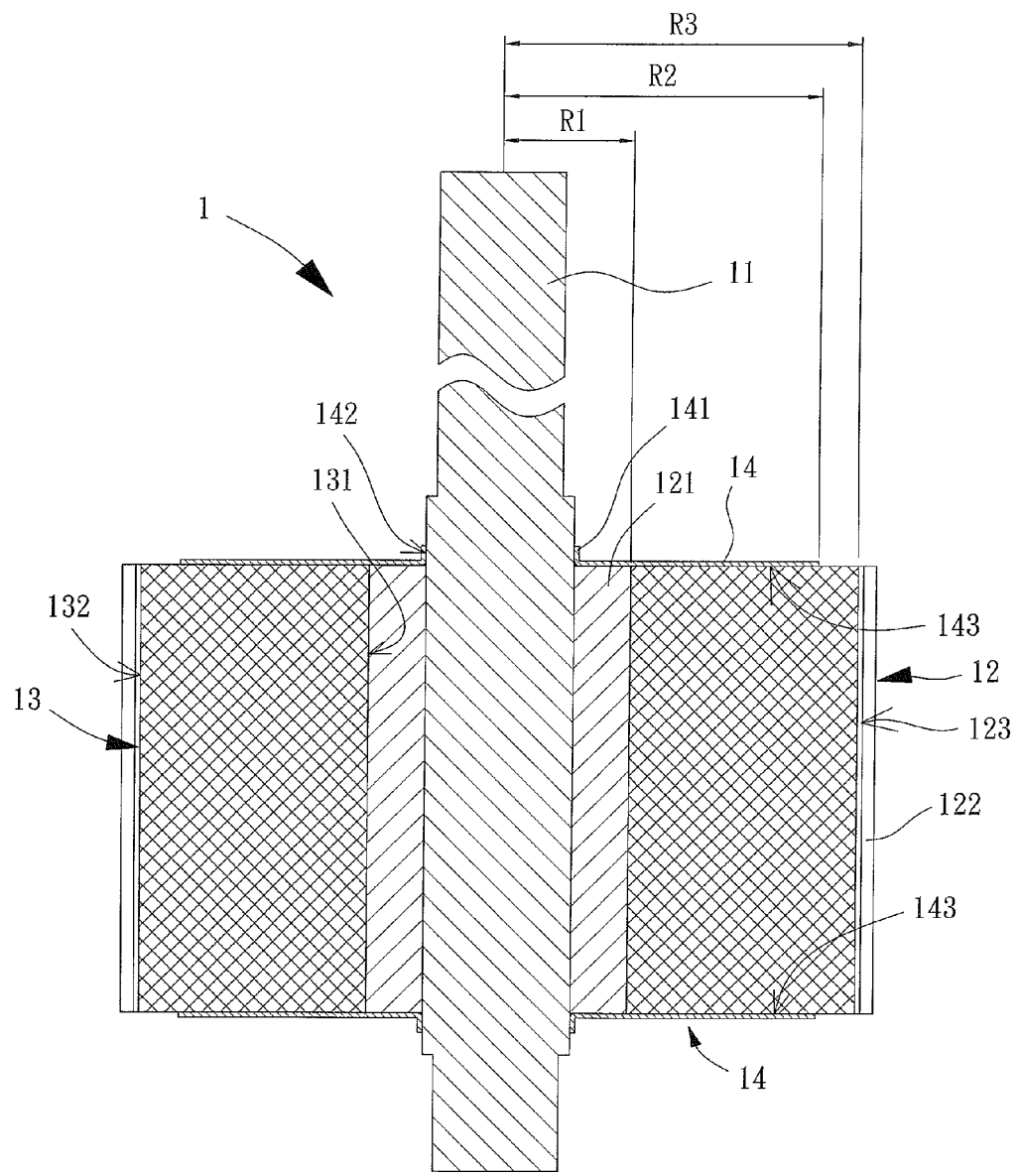
FIG. 4 is a cross sectional view of the rotor of the inner-rotor motor according to the first embodiment of the invention.

Referring to FIG. 4, each of the plurality of permanent magnets 13 includes a first face 131 facing the magnetic yoke portion 121, as well as a second face 132 facing away from the magnetic yoke portion 121. The first face 131 is spaced from the center of the shaft 11 at a first radius R1, which is the distance between the first face 131 and the center of the shaft 11 in the radial direction perpendicular to the shaft 11. Similarly, the covering face 143 of the limiting member 14 has a second radius R2, which is the maximum distance between the edge of the covering face 143 and the center of the shaft 11 in the radial direction perpendicular to the shaft 11. The second radius R2 is larger than the first radius R1. In this arrangement, the covering face 143 of the limiting member 14 is able to cover the plurality of permanent magnets 13 in the axle direction of the shaft 11.

In the inner-rotor motor according to the first embodiment of the invention, since the two limiting members 14 are respectively arranged at two sides of the iron core 12 to cover the plurality of permanent magnets 13 in the axle direction of the shaft 11, the plurality of permanent magnets 13 may be fixed in the receiving portions 123 of the iron core 12. Advantageously, the plurality of permanent magnets 13 will not disengage from the receiving portions 123 during the rotation of the rotor 1.

In the first embodiment, the covering face 143 of the limiting member 14 may abut against the plurality of permanent magnets 13 to reinforce the coupling effect between the plurality of permanent magnets 13 and the iron core 12. This can prevent the displacement of the plurality of permanent magnets 13 in the receiving portions 123 during the rotation of the rotor 1.

Furthermore, each of the plurality of magnetic pole portions 122 may include two protrusions 122a which are located radially outward of the shaft 11 and extend in circumferentially opposite directions. As such, the receiving portion 123 may be formed between two adjacent magnetic pole portions 122, the opposing protrusions 122a of the two adjacent magnetic pole portions 122, and the magnetic yoke portion 121. At this time, the opposing protrusions 122a can partially cover the second face 132 of the permanent magnet 13.

Besides, the second face 132 is spaced from the center of the shaft 11 at a third radius R3, which is the distance between the second face 132 and the center of the shaft 11 in the radial direction perpendicular to the shaft 11. The third radius R3 is larger than the first radius R1, and the second radius R2 may be smaller than the third radius R3. As such, the covering face 143 of the limiting member 14 covers only a part of the surface of each permanent magnet 13.

Figure 5:
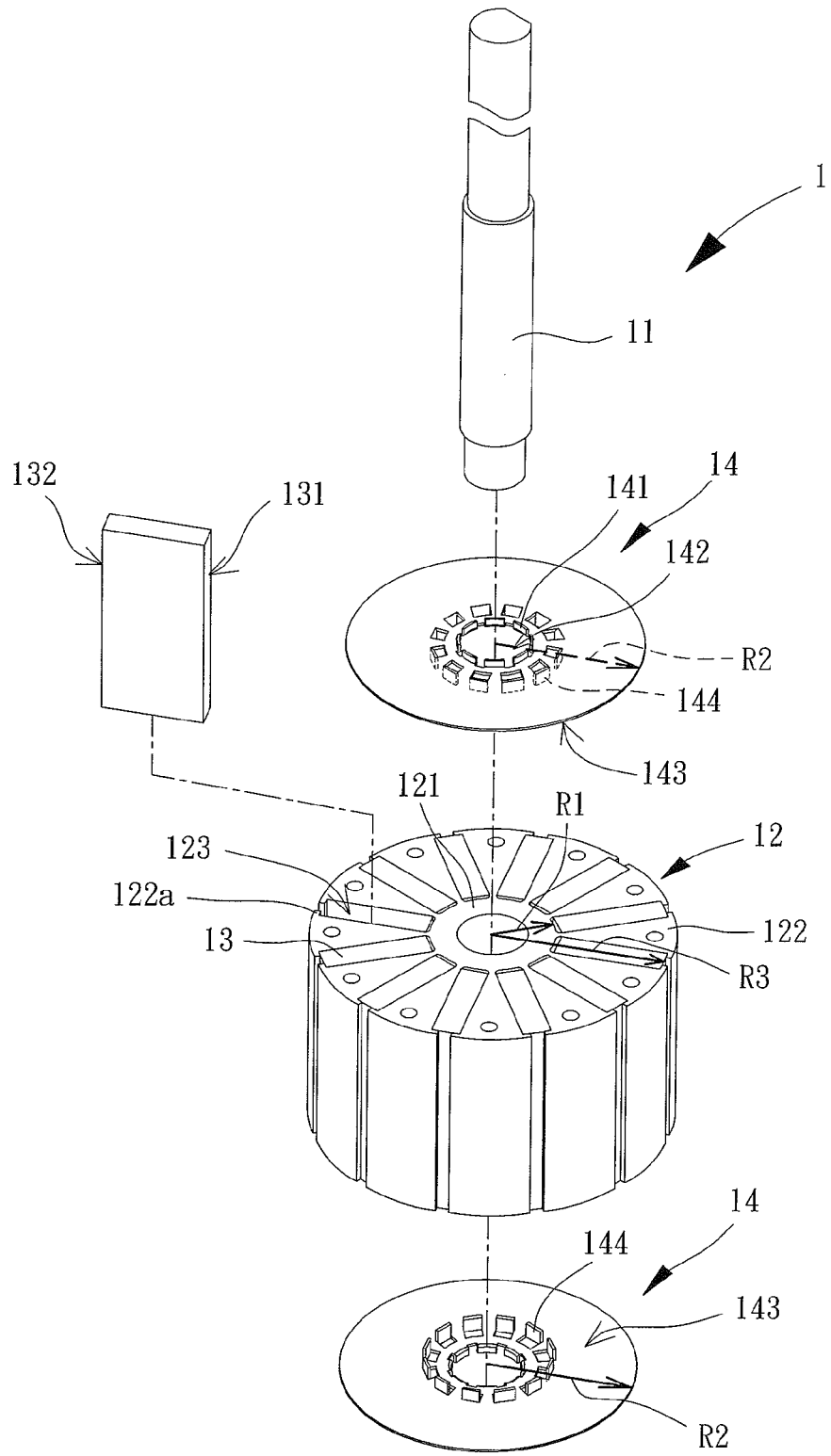
FIG. 5 is an exploded view of a rotor of an inner-rotor motor according to a second embodiment of the invention.
Figure 6:
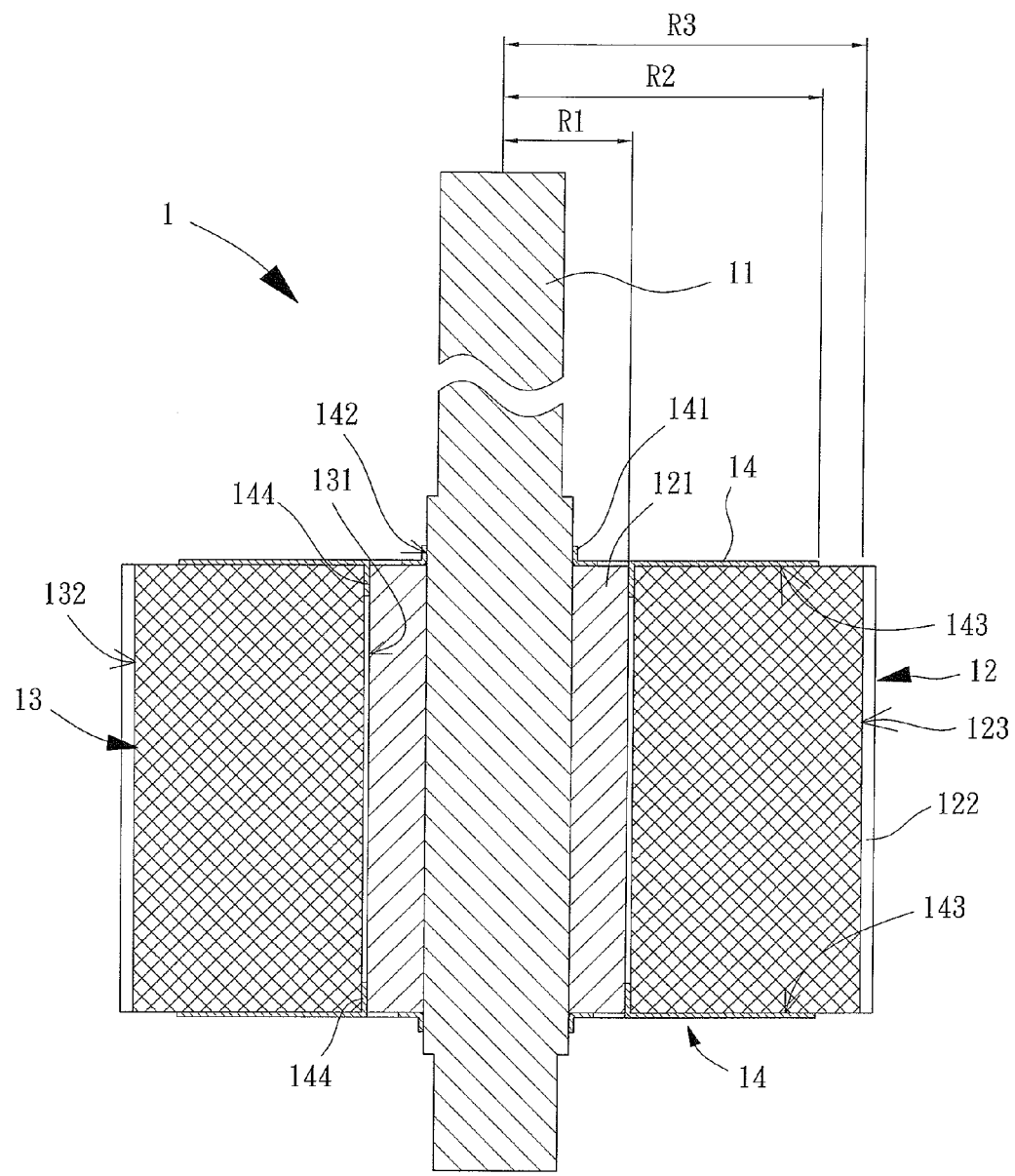
FIG. 6 is a cross sectional view of the rotor of the inner-rotor motor according to the second embodiment of the invention.

FIGS. 5 and 6 show a rotor 1 of an inner-rotor motor according to a second embodiment of the invention. The second embodiment differs from the first embodiment in that each of the limiting members 14 may include a plurality of engaging portions 144. The quantity of the plurality of engaging portions 144 is the same as that of the plurality of permanent magnets 13. The plurality of engaging portions 144 is circumferentially arranged around the shaft-coupling portion 141. The plurality of engaging portions 144 may be arranged on the covering face 143, extend towards the receiving portions 123, and abut against the first faces 131 of the plurality of permanent magnets 13. In other words, each of the plurality of engaging portions 144 can extend into a respective receiving portion 123 in order to abut against the first face 131 of a respective permanent magnet 13. When one engaging portion 144 extends into the receiving portion 123, the engaging portion 144 can abut against the first face 131 of the permanent magnet 13, and the two opposing protrusions 122a of the two adjacent magnetic pole portions 122 can abut against the second face 132 of the permanent magnet 13. As such, there will be no gap (or a very small gap) between the permanent magnet 13 and the magnetic pole portion 122, thereby reinforcing the coupling effect between the permanent magnet 13 and the iron core 12. The plurality of engaging portions 144 may be formed by a punching process in order to be integrally formed on the covering face 143. Alternatively, the plurality of engaging portions 144 may be independently formed from the covering face 143, and is later fixed to the covering face 143.

Figure 7:
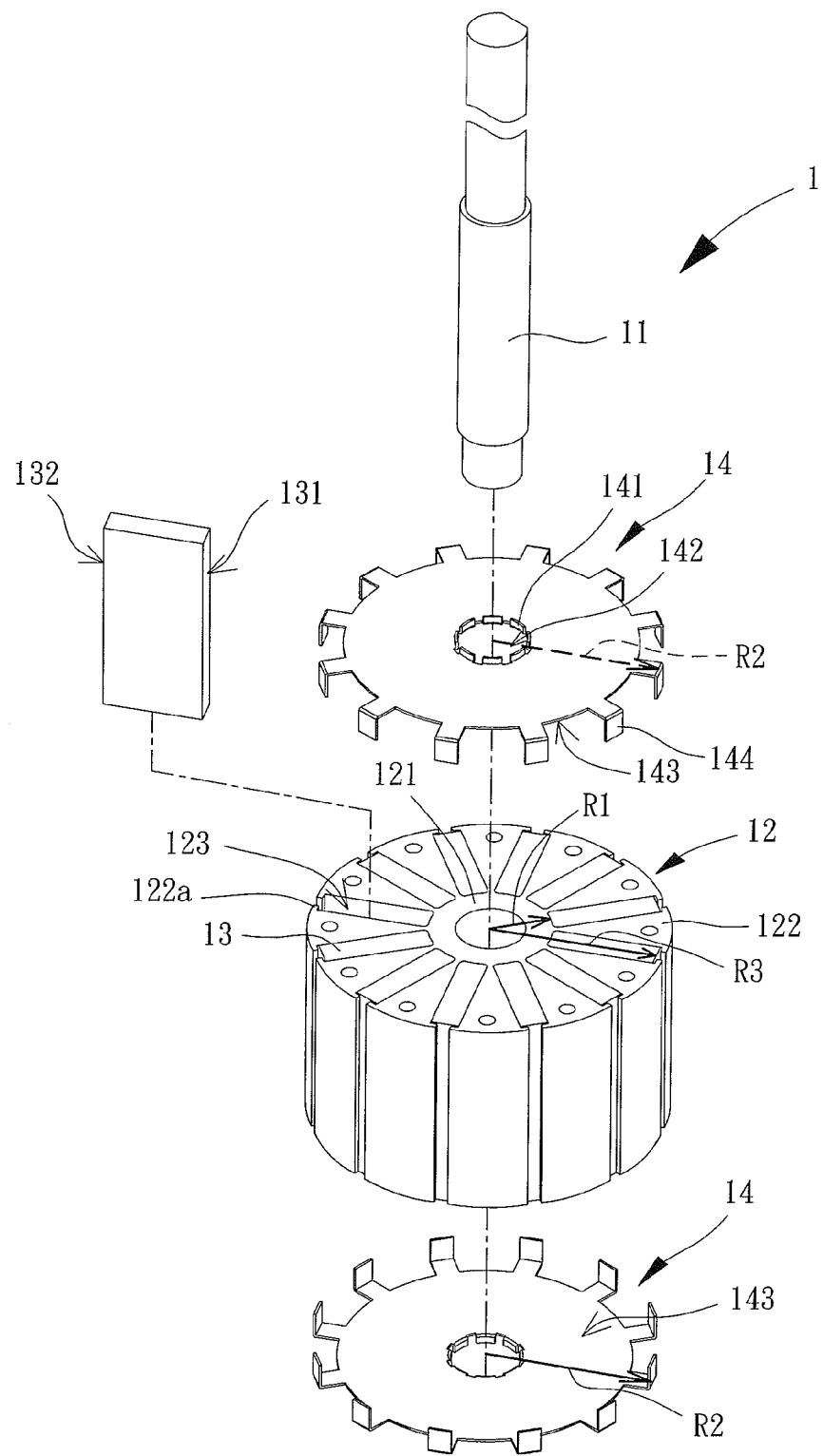
FIG. 7 is an exploded view of a rotor of an inner-rotor motor according to a third embodiment of the invention.
Figure 8:
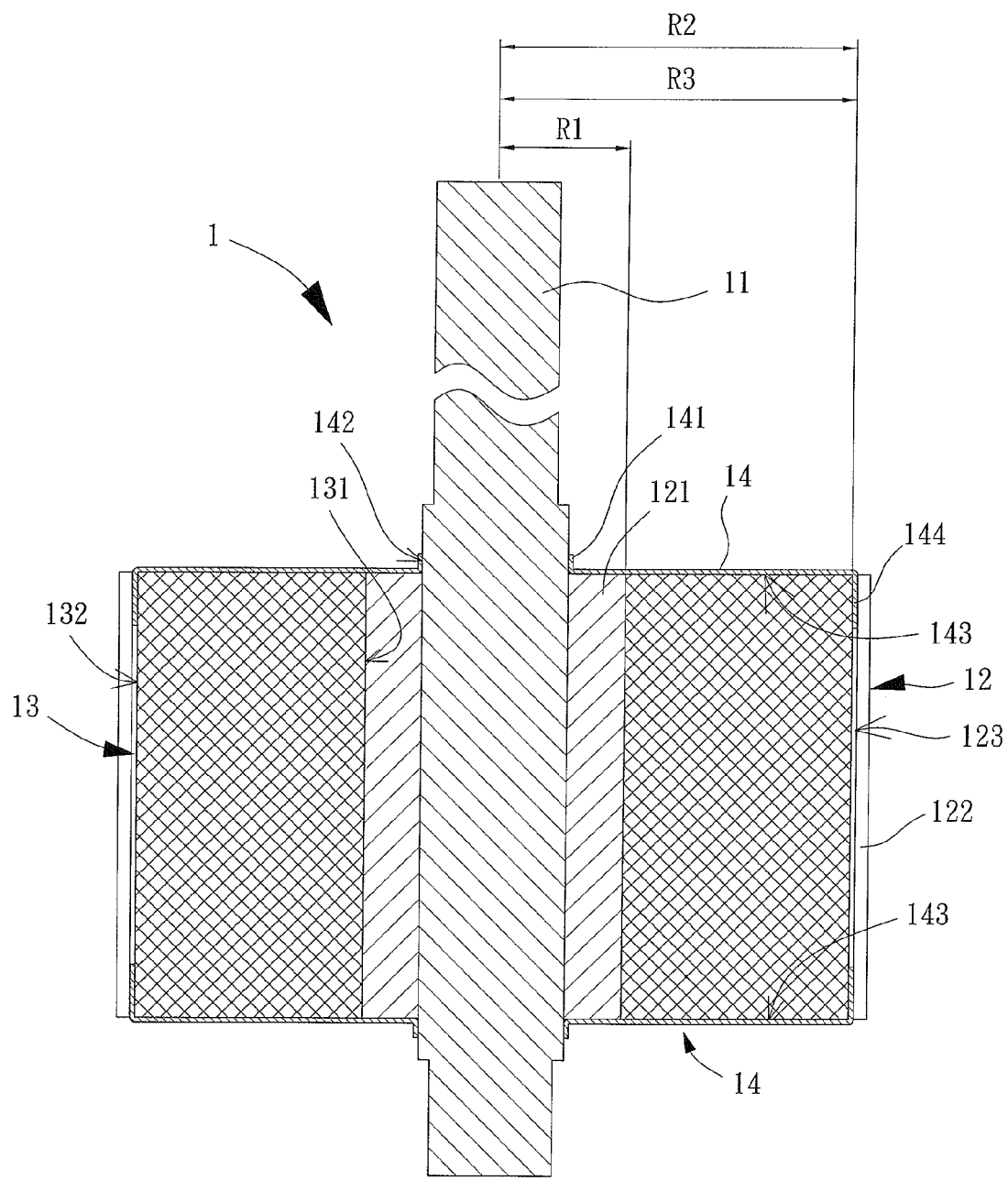
FIG. 8 is a cross sectional view of the rotor of the inner-rotor motor according to the third embodiment of the invention.

FIGS. 7 and 8 show a rotor 1 of an inner-rotor motor according to a third embodiment of the invention. The third embodiment differs from the first and second embodiments in that the second radius R2 is equal to or larger than the third radius R3. As such, the covering face 143 of the limiting member 14 is able to cover the entire surface of each of the plurality of permanent magnets 13, further enhancing the coupling effect between the plurality of permanent magnets 13 and the iron core 12.

Furthermore, each of the limiting members 14 may also include a plurality of engaging portions 144. The quantity of the plurality of engaging portions 144 is the same as that of the plurality of permanent magnets 13. The plurality of engaging portions 144 may be arranged on the edge of the covering face 143, extend towards the receiving portions 123, and abut against the second faces 132 of the plurality of permanent magnets 13. In other words, each of the plurality of engaging portions 144 can extend into a respective receiving portion 123 in order to abut against the second face 132 of a respective permanent magnet 13. Thus, each of the plurality of engaging portions 144 ensures that the first face 131 of the permanent magnet 13 can properly abut against the outer periphery of the magnetic yoke portion 121. As such, there will be no gap (or a very small gap) between the permanent magnet 13 and the magnetic yoke portion 121, thereby reinforcing the coupling effect between the permanent magnet 13 and the iron core 12. In this structure, the plurality of engaging portions 144 can be integrally formed on the covering face 143 in which the plurality of engaging portions 144 is bent towards the iron core 12 at the edge of the covering face 143. Alternatively, the plurality of engaging portions 144 may be independently formed from the covering face 143 and is later fixed to the covering face 143.

In the embodiment, the second radius R2 may be equal to the third radius R3, such that the edge of the covering face 143 is flush with the second face 132 of the permanent magnet 13. In this arrangement, each of the plurality of engaging portions 144 may extend parallel to the second face 132 of a respective permanent magnet 13, forming a face contact between the engaging portion 144 and the permanent magnet 13.

Figure 9:
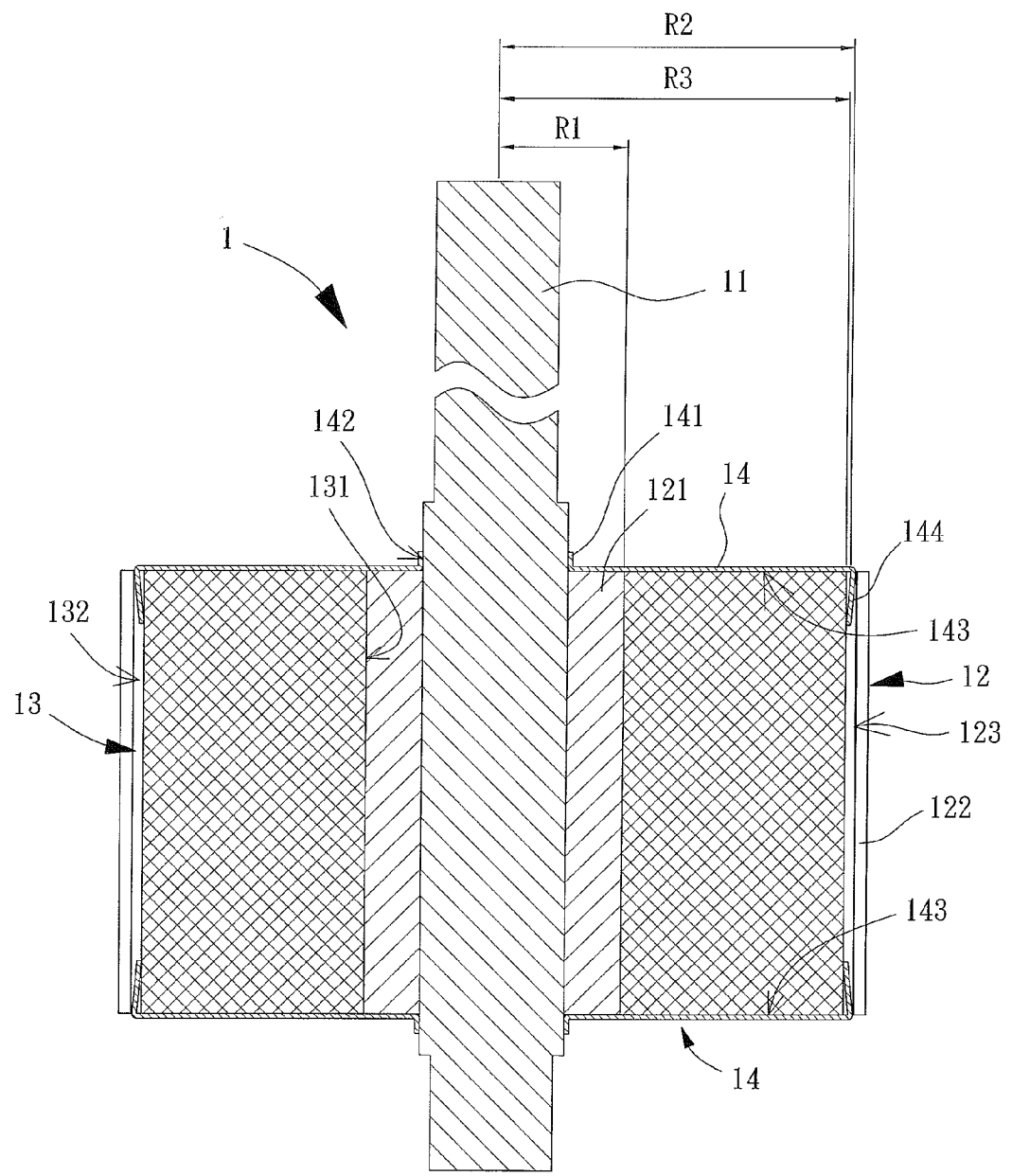
FIG. 9 is a cross sectional view of a rotor of an inner-rotor motor according to a fourth embodiment of the invention.
Figure 10:
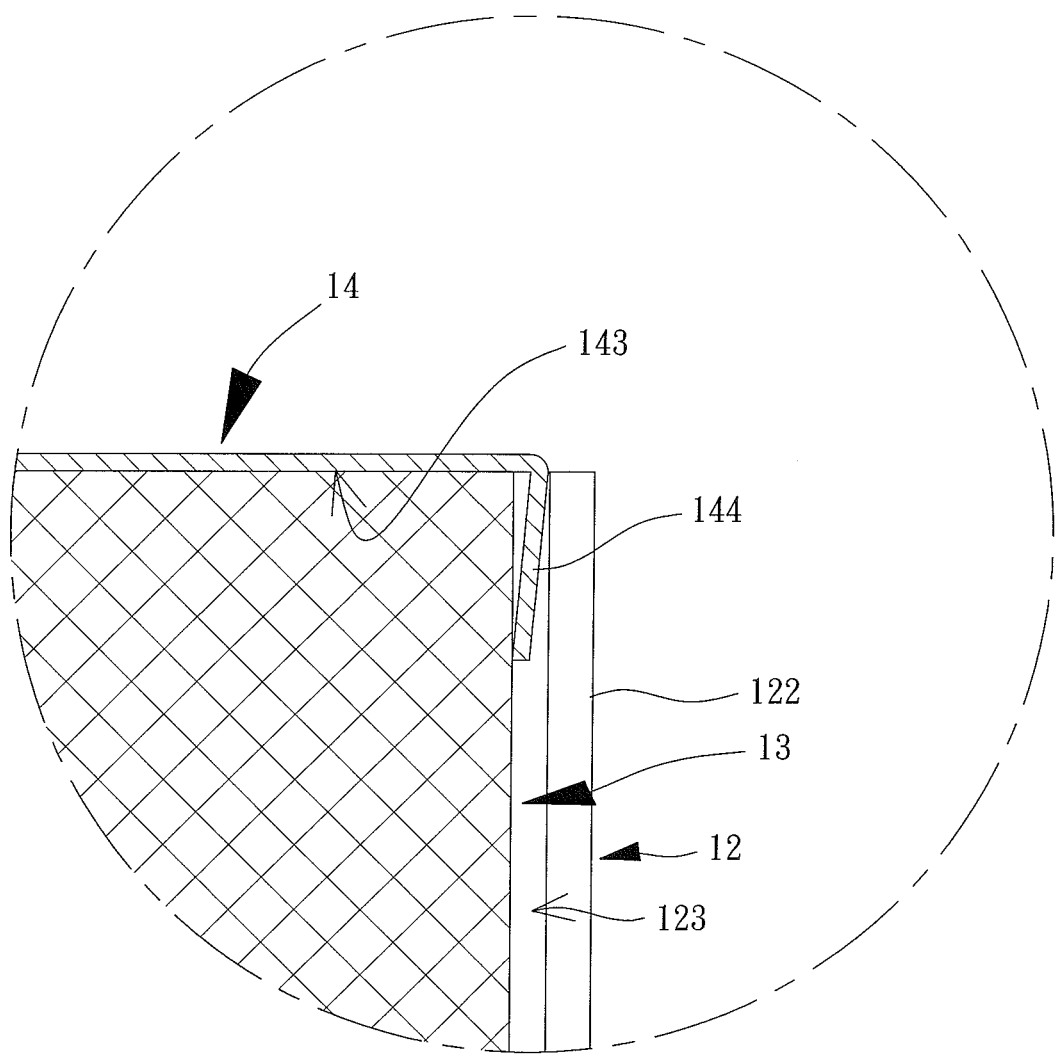
FIG. 10 is a partially enlarged, cross sectional view of the rotor of the inner-rotor motor according to the fourth embodiment of the invention.

FIG. 9 shows a rotor 1 of an inner-rotor motor according to a fourth embodiment of the invention. FIG. 10 is a partially enlarged, cross sectional view of a limiting member 14 of the rotor 1. In the embodiment, the limiting member 14 also includes a plurality of engaging portions 144. As compared with the first embodiment where each of the plurality of engaging portions 144 extends parallel to and is in face contact with the second face 132 of a respective permanent magnet 13, the second radius R2 may be larger than the third radius R3 in this embodiment. In other words, the covering face 143 of the limiting member 14 may extend beyond the second faces 132 of the plurality of permanent magnets 13 in the radial direction perpendicular to the shaft 11. As such, each of the plurality of engaging portions 144 may be nonparallel to the second face 132 of a respective permanent magnet 13. Instead, each of the plurality of engaging portions 144 extends towards the second face 132 of a respective permanent magnet 13, such that one end of the engaging portion 144 (distant to the covering face 143) is able to abut against the second face 132 of the permanent magnet 13. In this regard, the engaging portion 144 is in line contact with the second face 132 of the permanent magnet 13. The arrangement of the plurality of engaging portions 144 ensures that the first faces 131 of the plurality of permanent magnets 13 can properly abut against the outer periphery of the magnetic yoke portion 121. As such, there will be no gap (or a very small gap) between the permanent magnet 13 and the magnetic yoke portion 121, thereby reinforcing the coupling effect between the permanent magnet 13 and the iron core 12.

Figure 11:
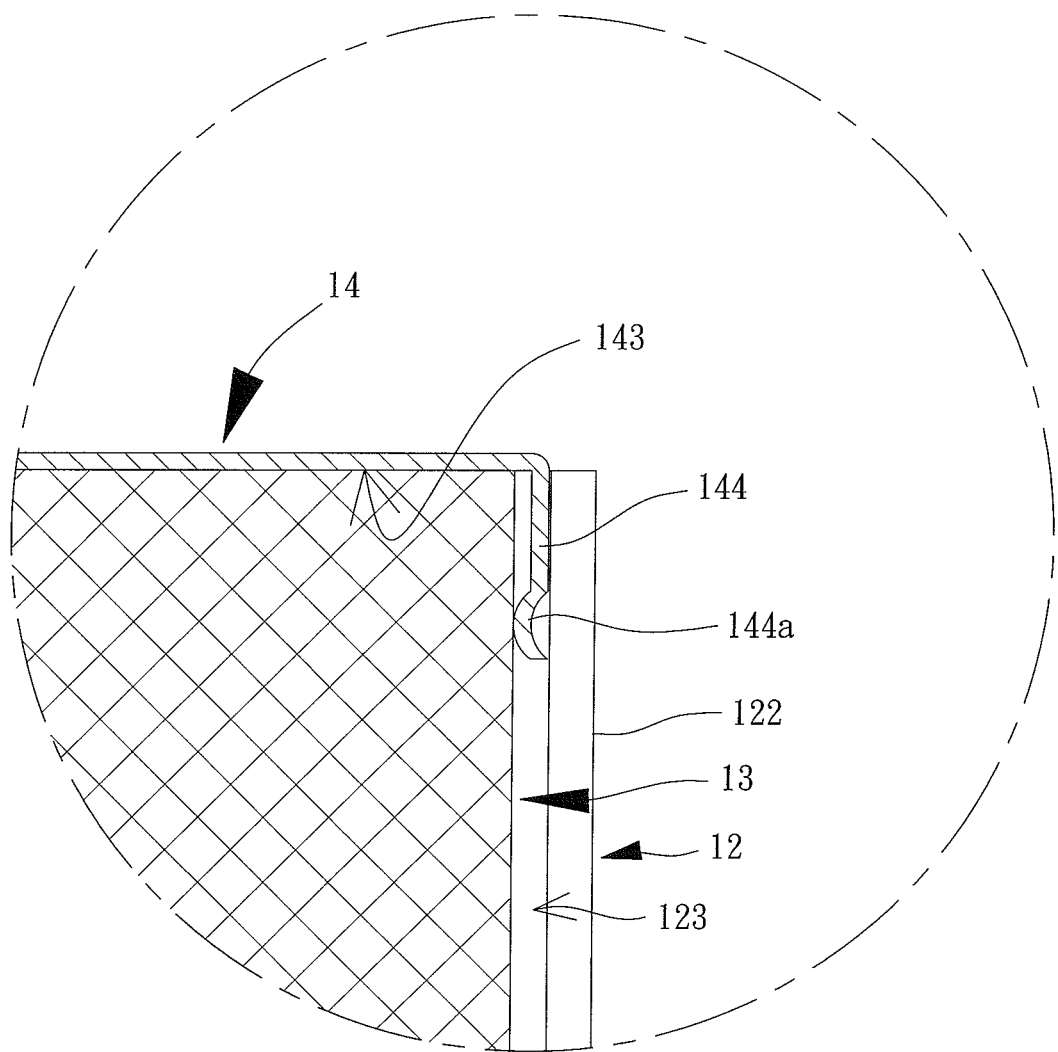
FIG. 11 is a partially enlarged, cross sectional view of a rotor of an inner-rotor motor according to a fifth embodiment of the invention.

FIG. 11 is a partially enlarged, cross sectional view of a limiting member 14 of a rotor of an inner-rotor motor according to a fifth embodiment of the invention. The limiting member 14 also includes a plurality of engaging portions 144. The fifth embodiment differs from the first embodiment in that each of the plurality of engaging portions 144 further includes a projection 144a that can abut against the second face 132 of a respective permanent magnet 13. The arrangement of the projections 144a of the plurality of engaging portions 144 also ensures that the first faces 131 of the plurality of permanent magnets 13 can properly abut against the outer periphery of the magnetic yoke portion 121. As such, there will be no gap (or a very small gap) between the permanent magnet 13 and the magnetic yoke portion 121, thereby reinforcing the coupling effect between the permanent magnet 13 and the iron core 12.

Figure 12:
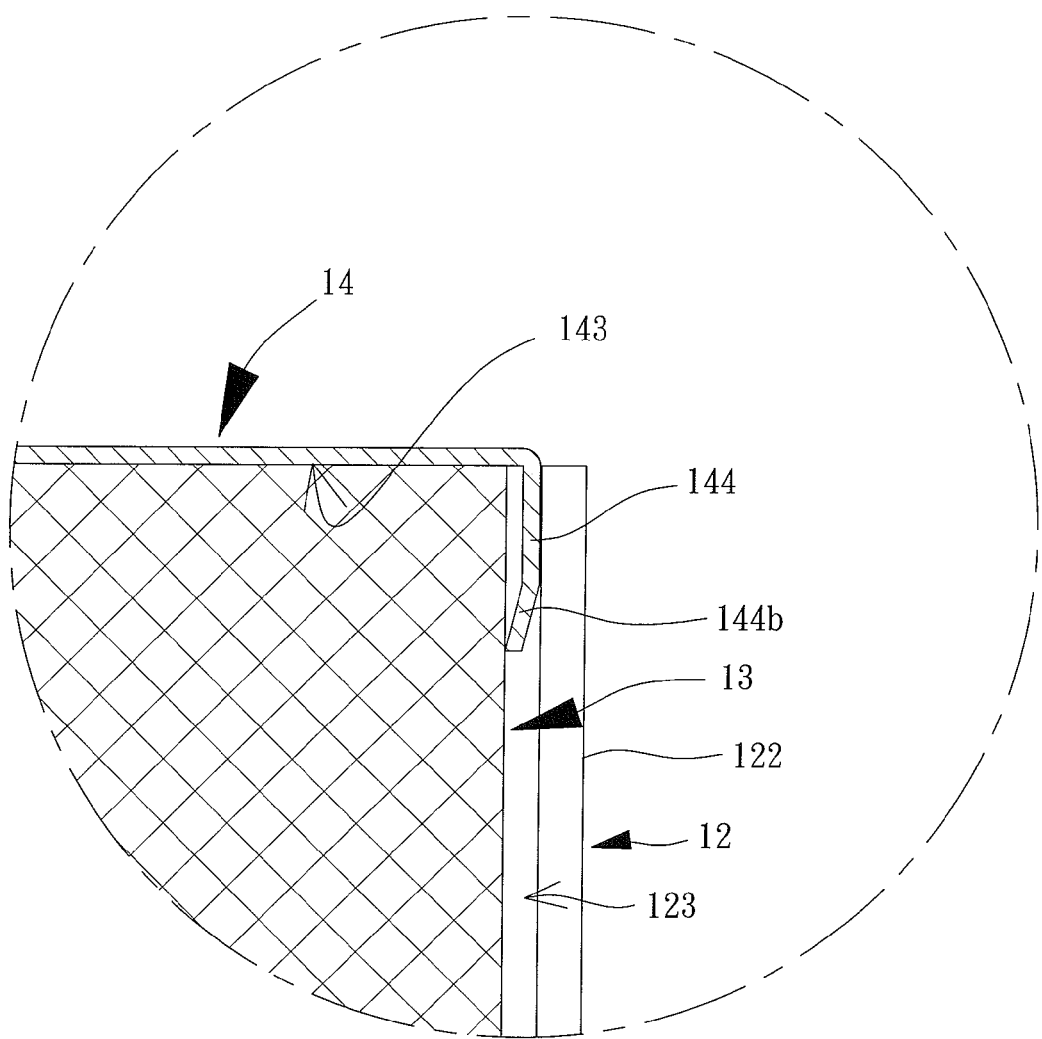
FIG. 12 is a partially enlarged, cross sectional view of a rotor of an inner-rotor motor according to a sixth embodiment of the invention.
Figure 13:
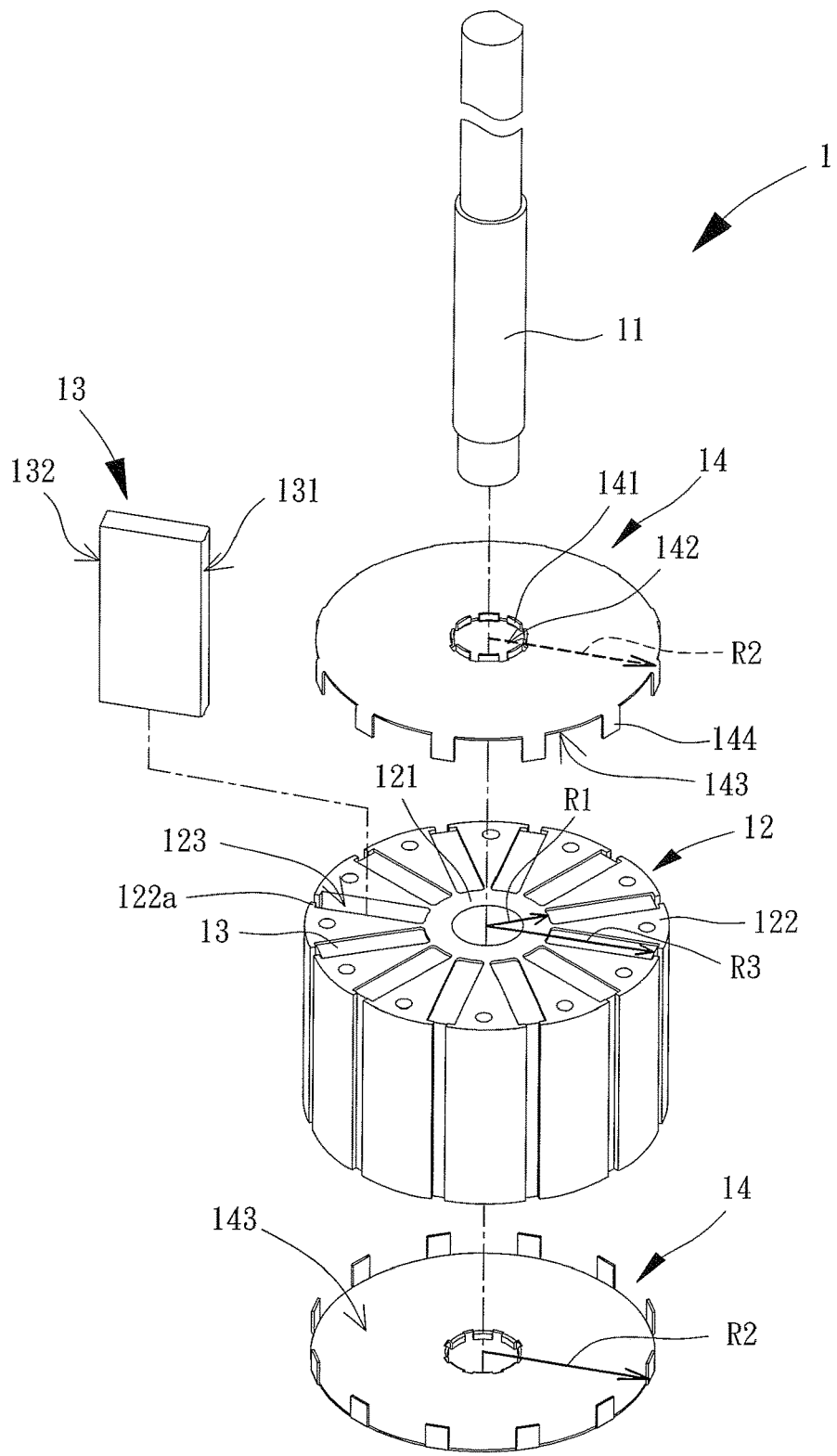
FIG. 13 is an exploded view of an inner-rotor motor with a modified rotor structure.

FIG. 12 is a partially enlarged, cross sectional view of a limiting member 14 of a rotor of an inner-rotor motor according to a sixth embodiment of the invention. The limiting member 14 also includes a plurality of engaging portions 144. The sixth embodiment differs from the first embodiment in that each of the plurality of engaging portions 144 includes an abutting portion 144b at the end distant to the covering face 143. The abutting portion 144b extends towards and abuts against the second face 132 of the permanent magnet 13. In this regard, the arrangement of the abutting portions 144b of the plurality of engaging portions 144 also ensures that the first faces 131 of the permanent magnet 13 can properly abut against the outer periphery of the magnetic yoke portion 121. As such, there will be no gap (or a very small gap) between the permanent magnet 13 and the magnetic yoke portion 121, thereby reinforcing the coupling effect between the permanent magnet 13 and the iron core 12.

Besides, although it has been described in the previous embodiments that the covering face 143 of the limiting member 14 can abut against the plurality of permanent magnets 13, the plurality of permanent magnets 13 can also be hidden in the receiving portions 123 in a further embodiment. As such, the covering face 143 of the limiting member 14 is spaced from the plurality of permanent magnets 13 at a distance. In this arrangement, since the covering face 143 of the limiting member 14 is able to cover the plurality of permanent magnets 13 in the axle direction of the shaft 11, the limiting members 14 are able to fix the plurality of permanent magnets 13 in the receiving portions 123. This prevents the plurality of permanent magnets 13 from disengaging from the receiving portions 123 during the rotation of the rotor 1.

Based on the structures of the inner-rotor motors and the rotors 1 of the motors disclosed in the various embodiments above, one limiting member 14 can be arranged at one side of the iron core 12 (or two limiting members 14 are respectively arranged at two sides of the iron core 12) in the axle direction of the shaft 11 to cover the plurality of permanent magnets 13. As such, the limiting member(s) 14 is able to fix the plurality of permanent magnets 13 in position in the receiving portions 123, to prevent the plurality of permanent magnets 13 from disengaging from the receiving portions 123 during the rotation of the rotor 1. As stated above, in the structure of the conventional inner-rotor motor, the plurality of permanent magnets 93 of the rotor 9 tends to displace in the magnet-receiving gap 923 during the rotation of the rotor 9, leading to disengagement of the plurality of permanent magnets 93 from the magnet-receiving gap 923 and resulting in the generation of the noise and vibration. In contrast, the rotor 1 of the inner-rotor motor as disclosed in various embodiments of the invention does not have the above disadvantages of the conventional inner-rotor motor. The rotor 1 of the inner-rotor motor in the various embodiments of the invention is capable of effectively reducing the noise or vibration of the inner-rotor motor.

Furthermore, as compared with the rotor 9 of the conventional inner-rotor motor which requires the gap 94 between the tubular connection portion 921 and the permanent magnet 93 to be filled with an adhesive to reinforce the bonding effect between the permanent magnet 93 and the iron core 92, the rotor 1 of the inner-rotor motor as disclosed in the various embodiments of the invention is able to reinforce the coupling effect between the plurality of permanent magnets 13 and the iron core 12 by simply coupling one or more limiting members 14 with the shaft 11 without applying the adhesive between the plurality of permanent magnets 13 and the magnetic yoke portion 121. Thus, the production procedure of the rotor of the inner-rotor motor is simplified.

Moreover, as compared with the rotor 9 of the conventional inner-rotor motor where the adhesive is used to reinforce the bonding effect between the plurality of permanent magnets 93 and the iron core 92 but the bonding effect degrades as the adhesive deteriorates or gradually disengages from the gaps 94 as time passes, the rotor 1 of the inner-rotor motor as disclosed in the various embodiments of the invention simply uses one or more limiting members 14 that are coupled to the shaft 11 by ways of press fitting, screwing or welding. Since the coupling effect between the one or more limiting members 14 and the shaft 11 does not degrade after the rotor 1 is used for a long time, the service life of the rotor 1 of the inner-rotor motor can be prolonged.

In some embodiments of the invention, the covering face 143 of each of the limiting members 14 can abut against the plurality of permanent magnets 13 to reinforce the coupling effect between the plurality of permanent magnets 13 and the iron core 12. This effectively prevents the displacement of the plurality of permanent magnets 13 in the receiving portions 123 during the rotation of the rotor 1, thereby reducing the noise or vibration of the inner-rotor motor.

As stated previously, each of the limiting members 14 may include a plurality of engaging portions 144 in some embodiments of the invention. In this regard, the plurality of engaging portions 144 can abut against the first faces 131 of the plurality of permanent magnets 13, ensuring that the second face 132 of a respective permanent magnet 13 can abut against two opposing protrusions 122a of the two adjacent magnetic pole portions 122. Alternatively, each of the plurality of engaging portions 144 can directly abut against the second face 132 of a respective permanent magnet 13, or can indirectly abut against the second face 132 of the permanent magnet 13 (through the projection 144a or the abutting portion 144b). As such, it can be ensured that the first face 131 of each of the plurality of permanent magnets 13 properly abuts against the outer periphery of the magnetic yoke portion 121. Therefore, there will be no gap (or a very small gap) between the permanent magnet 13 and the magnetic yoke portion 121, thereby reinforcing the coupling effect between the permanent magnet 13 and the iron core 12. Advantageously, the effect in reducing the noise or vibration of the inner-rotor motor will be more noticeable. In addition, in some embodiments of the invention, the quantity of the at least one limiting member 14 can be two, in which the two limiting members 14 are respectively arranged at two sides of the iron core 12 in the axle direction of the shaft 11. Accordingly, the plurality of permanent magnets 13 can be clamped between the two limiting members 14, achieving an enhanced effect in reducing the noise or vibration of the inner-rotor motor.

In summary, through the arrangement of the at least one limiting member 14 of the rotor 1 of the motor, the inner-rotor motor using the rotor 1 is able to reduce the noise or vibration generated during the operation thereof, to reduce the complexity of the production procedure of the rotor 1, and to prolong the service life of the rotor 1.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A rotor of an inner-rotor motor, comprising:
    a shaft;
    an iron core comprising a magnetic yoke portion coupled with an outer periphery of the shaft, as well as a plurality of magnetic pole portions circumferentially coupled with an outer periphery of the magnetic yoke portion, wherein the iron core forms a plurality of receiving portions, and wherein each of the plurality of receiving portions is formed between adjacent two of the plurality of magnetic pole portions;
    a plurality of permanent magnets received in the plurality of receiving portions, respectively; and
    a limiting member arranged at one side of the iron core in an axle direction of the shaft, wherein the limiting member comprises a covering face covering the plurality of permanent magnets in the axle direction of the shaft, wherein each of the plurality of permanent magnets comprises a first face facing the magnetic yoke portion, wherein the limiting member comprises a plurality of engaging portions and wherein each of the plurality of engaging portions extends towards a respective one of the plurality of receiving portions and abuts against the first face of a respective one of the plurality of permanent magnets.

2. The rotor of the inner-rotor motor as claimed in claim 1, wherein each of the plurality of permanent magnets further comprises a second face facing away from the magnetic yoke portion, wherein the first face is spaced from a center of the shaft at a first radius, wherein the first radius is a distance between the first face and the center of the shaft in a radial direction perpendicular to the shaft, wherein the covering face has a second radius, wherein the second radius is a maximum distance between an edge of the covering face and the center of the shaft in the radial direction perpendicular to the shaft, and wherein the second radius is larger than the first radius.

3. The rotor of the inner-rotor motor as claimed in claim 2, wherein the second face is spaced from the center of the shaft at a third radius, wherein the third radius is a distance between the second face and the center of the shaft in the radial direction perpendicular to the shaft, and wherein the third radius is larger than the first radius, and the second radius is equal to or larger than the third radius.

4. The rotor of the inner-rotor motor as claimed in claim 1, further comprising another limiting member arranged at another side of the iron core in the axle direction of the shaft.

5. The rotor of the inner-rotor motor as claimed in claim 1, wherein the limiting member is made of magnetically nonconductive material.

6. The rotor of the inner-rotor motor as claimed in claim 1, wherein the limiting member comprises a shaft-coupling portion at a center of the limiting member, wherein the shaft-coupling portion forms a shaft hole, and wherein the shaft extends through and couples with the shaft-coupling portion in a press fit manner.

7. The rotor of the inner-rotor motor as claimed in claim 1, wherein the plurality of receiving portions extends through the iron core from one end face to another end face in the axle direction of the shaft.

8. The rotor of the inner-rotor motor as claimed in claim 1, wherein the plurality of permanent magnets has a same quantity as the plurality of magnetic pole portions, and the plurality of receiving portions also has a same quantity as the plurality of magnetic pole portions.

9. The rotor of the inner-rotor motor as claimed in claim 1, wherein the covering face abuts against the plurality of permanent magnets.

10. The rotor of the inner-rotor motor as claimed in claim 1, wherein the covering face is formed on one face of the limiting member facing the iron core in the axle direction of the shaft.

11. The rotor of the inner-rotor motor as claimed in claim 1, wherein each of the plurality of magnetic pole portions comprises two protrusions which are located radially outwards of the shaft and extend in circumferentially opposite directions, wherein each of the plurality of permanent magnets further comprises a second face facing away from the magnetic yoke portion and abutting against the two protrusions of adjacent two of the plurality of magnetic pole portions.

12. The rotor of the inner-rotor motor as claimed in claim 1, wherein the limiting member comprises a shaft-coupling portion at a center of the limiting member, wherein the shaft-coupling portion forms a shaft hole, wherein the shaft extends through the shaft hole, and wherein the plurality of engaging portions is circumferentially arranged around the shaft-coupling portion.

13. The rotor of the inner-rotor motor as claimed in claim 12, wherein the plurality of engaging portions is formed on the covering face.

14. The rotor of the inner-rotor motor as claimed in claim 1, wherein each of the plurality of permanent magnets further comprises a second face facing away from the magnetic yoke portion, and wherein the first face abuts against the outer periphery of the magnetic yoke portion.

15. An inner-rotor motor having the rotor as claimed in claim 1, comprising a stator in an enclosed form having a compartment, wherein the iron core and the plurality of permanent magnets are received in the compartment, and wherein the shaft is rotatably coupled with the stator.

16. A rotor of the inner-rotor motor comprising:
a shaft:
an iron core comprising a magnetic yoke portion coupled with an outer periphery of the shaft, as well as a plurality of magnetic pole portions circumferentially coupled with an outer periphery of the magnetic yoke portion, wherein the iron core forms a plurality of receiving portions, and wherein each of the plurality of receiving portions is formed between adjacent tw of the plurality of magnetic pole portions:
a plurality of permanent magnets received in the plurality of receiving portions, respectively; and
a limiting member arranged at one side of the iron core in an axle direction of the shaft, wherein the limiting member comprises a covering face covering the plurality of permanent magnets in the axle direction of the shaft,
wherein each of the plurality of permanent magnets comprises a first face facing and abutting against the outer periphery of the magnetic yoke portion, as well as a second face facing away from the magnetic yoke portion, wherein the limiting member comprises a plurality of engaging portions, and wherein each of the plurality of engaging portions extends towards a respective one of the plurality of receiving portions and abuts against the second face of a respective one of the plurality of permanent magnets.

17. The rotor of the inner-rotor motor as claimed in claim 16, wherein the plurality of engaging portions is arranged at an edge of the covering face.

18. The rotor of the inner-rotor motor as claimed in claim 17, wherein the plurality of engaging portions is bent towards the iron core at the edge of the covering face.

19. The rotor of the inner-rotor motor as claimed in claim 16, wherein each of the plurality of engaging portions comprises a projection abutting against the second face of the respective one of the plurality of permanent magnets.

20. The rotor of the inner-rotor motor as claimed in claim 16, wherein each of the plurality of engaging portions comprises an abutting portion distant to the covering face, and wherein the abutting portion extends towards and abuts against the second face of the respective one of the plurality of permanent magnets.

* * * * *